United States Patent [19]

Nutley et al.

[11] 4,194,124

[45] Mar. 18, 1980

[54] METHOD OF PREVENTING VAPOR EXPLOSIONS CAUSED BY CONTACT OF TWO LIQUIDS HAVING DIFFERENT TEMPERATURES

[76] Inventors: Hugh Nutley, 827 W. Barrett, Seattle, Wash. 98119; Howard S. Gardner, 5743 NE. 56th, Seattle, Wash. 98105

[21] Appl. No.: 840,756

[22] Filed: Oct. 11, 1977

[51] Int. Cl.² .............................................. G01N 23/00
[52] U.S. Cl. ............................. 250/492 R; 250/432 R
[58] Field of Search ............................ 250/492 R, 432

[56] References Cited

U.S. PATENT DOCUMENTS 3,862,427  1/1975  Trump .............................. 250/492 R Primary Examiner—Bruce C. Anderson
Attorney, Agent, or Firm—Seed, Berry, Vernon & Baynham

[57] ABSTRACT

Vapor explosions caused by contact of two liquids having differing temperatures, such as occurs in a chemical recovery furnace containing molten smelt when water accidentally contacts the molten smelt, are prevented by subjecting the water/molten smelt interface to sufficient radiation to prevent such explosions by creation of multiple bubble nuclei which result in non-explosive nucleate boiling.

9 Claims, No Drawings

METHOD OF PREVENTING VAPOR EXPLOSIONS CAUSED BY CONTACT OF TWO LIQUIDS HAVING DIFFERENT TEMPERATURES

BACKGROUND OF THE INVENTION

1. Field of the Invention

This invention relates to a method of preventing vapor explosions caused by contact of two liquids having different temperatures.

2. Description of the Prior Art

The contact and subsequent explosion of two liquids having different temperatures occurs in chemical recovery furnaces when water contacts the pool of molten smelt formed during the recovery of the inorganic cooking chemicals used in the pulping process for wood either by inadvertent introduction of water, water leaks, or introduction of dilute black liquor. The smelt-water system is susceptible to vapor explosions over a range of possible temperatures. A vapor explosion may be defined as a rapid vaporization of an amount of a cooler liquid by heat transfer from a hot liquid. Vapor explosions occur not only in the pulp industry but also, under certain conditions, may occur in the metal smelting, nuclear power and liquefied natural gas industries. The explosion mechanism is not fully understood, although several theoretical mechanisms have been advanced.

Vapor explosions in pulp mills present not only a serious threat to continuous operation of the pulp mill, since some pulp mills utilize only one chemical recovery furnace, but they also pose a continuing threat to the safety of operating personnel at the furnace.

Methods for minimizing or inhibiting such vapor explosions have been advanced, such as by depressing the melting point of the smelt when water encounters the smelt by massive addition of a smelt cooling agent. Sodium bicarbonate, ammonium carbonate and ammonium bicarbonate have been suggested as smelt cooling agents. W. Nelson, "A Theory to Explain Physical Explosions," Tappi, 56, #3, p. 121 (1973); and U.S. Pat. No. 3,615,175. U.S. Pat. No. 3,873,413 teaches the addition of lithium carbonate, lithium hydroxide, sodium hydroxide, potassium carbonate, potassium hydroxide, potassium borate, sodium borate and lithium borate to the pulping cycle in the kraft pulping process to lower the melting point of the smelt to reduce vapor explosions. U.S. Pat. No. 3,447,895 teaches the introduction of an aqueous quenching solution consisting of ammonium sulfate or polymeric glycols onto molten kraft smelt.

SUMMARY OF THE INVENTION

It is a primary object of this invention to provide a method for preventing vapor explosions caused by contact of two liquids having different temperatures by subjecting the liquid interface to sufficient radiation to create multiple bubble nuclei which result in non-exlosive nucleate boiling.

It is a further object of this invention to provide a method of preventing vapor explosions in a chemical recovery furnace containing molten smelt, the vapor explosions caused by water or aqueous solutions contacting the molten smelt, by subjecting the smelt-water interface to sufficient radiation to prevent such explosions.

It is a further object of this invention to provide a method for preventing vapor explosions caused by contact of liquids having different temperatures by placing sources of radiation around the periphery of a furnace containing molten smelt with the radiation directed so as to penetrate the molten mass from the periphery.

These and other objects are accomplished by generating sufficient nucleate boiling sites within the cooler phase of a two-phase liquid system susceptible to vapor explosions.

DETAILED DESCRIPTION OF THE PREFERRED EMBODIMENTS

One theoretical reason advanced for the cause of vapor explosions is that homogenous nucleation produced at the interface between liquids at different temperatures fragments the liquids into sufficiently small fragments to generate vapor explosions. This "limit of superheat fragmentation process" theorizes that a stable film boiling layer will collapse at some area giving liquid-liquid contact and allow heat to pour through this area at a high rate and raise the cooler liquid temperature far above its equilibrium point. There is no boiling at the interface since there are negligible numbers of nucleate boiling centers on the smooth interface between the liquids or in the thin volume of cooler liquid next to the interface with the hotter liquid. When the cooler liquid reaches its thermodynamic limit of superheat, the thin layer of cooler liquid erupts by homogeneous nucleation which fragments the liquids into each other creating vastly more interfacial surface and thus triggering a vapor explosion. Vapor explosions can be prevented by preventing the triggering by homogeneous nucleation of such explosions. It is believed that generation of multiple bubble nuclei of at least the critical size which will grow and absorb heat in the superheated volume of cooler liquid prevents such explosions. Such nucleate boiling sites can be generated by subjecting the liquid interface to sufficient radiation to create a multitude of bubble nuclei.

Types of radiation which can be employed include nuclear particle, electromagnetic and acoustic radiation. Nuclear particle radiation includes proton or electron beam radiation of sufficient energy to cause nucleate boiling throughout the two-phase liquid system. Neutron particles may be used provided there is proper containment because of the radioactivity induced in the material being irradiated by the neutrons. Electromagnetic radiation may include X-ray or gamma radiation of sufficient energy to cause nucleate boiling throughout the two-phase liquid system. Acoustic radiation on the order of 20 kHz. or greater will input sufficient energy in a two-component phase system to cause nucleate boiling. Electromagnetic radiation is preferred, particularly gamma radiation.

Any source of gamma radiation having adequate energy and intensity may be used. Cobalt and cesium isotopes are examples of sources of gamma radiation which can be used, i.e. 5.3 year $Co^{60}$ having two gamma rays per disintegration at 1.17 Mev and 1.33 Mev and 30 year $Cs^{137}$ having a 0.66 Mev gamma. The intensity of gamma radiation may range from 200 to 1,200,000 r/hr.

The most practical way to get the required intensity and energy level of gamma radiation directed at the liquid interface of the smelt-water is to place multiple radioactive sources around the periphery of the container holding the molten smelt. The radiation penetrates into the two-phase liquid system to create bubble nuclei at or near the liquid interface sufficient to prevent a vapor explosion.

Gamma radiation has advantages over other methods of preventing vapor explosions in that it does not make the furnace or the smelt radioactive and, at the intensities and energy levels needed, does not damage the steel from which the furnace is made. It is necessary to shield operating personnel from stray radiation; however, this can be accomplished using concrete or lead shielding of suitable thickness positioned in appropriate places.

A series of eleven tests were carried out which are illustrative of the method claimed. Water at 18° C. was dropped into molten sodium chloride at 1,000 plus or minus 40° C. without radiation and in the presence of gamma radiation from a $Co^{60}$ source.

To determine the intensity of radiation before firing, a probe for gamma radiation was located in a graphite vessel for holding molten sodium chloride before being placed in the resistance furnace. A $Co^{60}$ gamma radiation source raised from a fourteen foot water well was positioned at various distances from the graphite vessel. Dose rates received by the graphite vessel as a function of source position were determined as measured by the gamma probe located in the graphite vessel.

A charge of 70 ml of dry sodium chloride was placed in a conical hole 12.5 cm deep and 3.8 cm wide at the top of the graphite vessel. The graphite vessel was then placed inside a vertical resistance furnace and the vessel brought to a temperature of 1,000° C. as determined by visual inspection with an optical pyrometer. A calibrated acoustic pickup (124 dB producing 23.5 millivolts) was located 123 cm from the graphite vessel containing the dry sodium chloride. The acoustic pickup was designed to sense acoustic energy caused by a vapor explosion to trigger an oscilloscope set at a trigger level of 82 dB, the signal from the acoustic pickup being routed to a 1A1 preamplifier in a 565 dual-beam Tektronics oscilloscope fitted with a Polaroid camera.

A flat paddle of asbestos 15 cm wide, 1.8 cm thick and 30 cm long was positioned just over the top of the resistance furnace and rotated to the open position to expose the graphite vessel containing the molten sodium chloride by means of a small, remotely controlled electric motor. Above the opening in the graphite rod was suspended a 5 cm long section of hollow ceramic tubing having an outer diameter of 0.29 cm. At the bottom end of the tubing a ceramic hemispherical button, 0.77 cm in diameter, was attached. The hole in the top end of the tubing was plugged to permit the hemisphere at the lower end of the tubing to hold, by surface tension, a 250 mg drop of water at 18° C.

When the experiment was ready to be performed the paddle of asbestos was rotated to expose the molten salt in the graphite vessel and the 250 mg drop of water held by the ceramic tubing dropped onto the surface of the molten salt contained in the graphite vessel.

The following table illustrates the results of the test.

TABLE I

| Test | Characteristics |
| --- | --- |
| #1, Control (no radiation) | Good explosion with 165 dB peak signal at acoustic pickup. Salt in the graphite vessel was blasted against the ceiling shield. |
| #2, 4,300 r/min. gamma radiation directed against the graphite vessel containing the molten sodium chloride. | No explosion. |

TABLE I-continued

| Test | Characteristics |
| --- | --- |
| #3, 500 r/min. gamma radiation directed at the graphite vessel containing the molten sodium chloride. | No explosion. |
| #4, 50 r/min. gamma radiation directed at the graphite vessel containing the molten salt. | No explosion. |
| #5, no radiation. | An explosion with 200 dB peak signal at the acoustic pickup. Molten salt was blasted against the ceiling shield. |
| #6, 25 r/min. gamma radiation directed at the graphite vessel containing the molten sodium chloride. | No burst was recorded by the oscilloscope but a muffled "plop" was heard and some salt globules were thrown up from the salt pool. |
| #7, 19 r/min. gamma radiation directed at the graphite vessel containing the molten salt. | The oscilloscope was not triggered although a muffled "plop" was heard. |
| #8, no radiation. | Good explosion with 165 dB peak signal at the acoustic pickup. Molten salt was blasted against the ceiling shield |
| #9, 15 r/min. gamma radiation directed at the graphite vessel containing the molten salt. | The oscilloscope was not triggered; however a very soft "thud" was heard. |
| #10, 15 r/min. gamma radiation directed at the graphite vessel containing the molten salt. | The oscilloscope was not triggered. |
| #11, no radiation. | A good burst with 200 dB peak signal at the acoustic pickup Molten salt was blasted against the ceiling shield |

We claim:

1. A method of preventing vapor explosions caused by contact of two liquids having different temperatures comprising:
    irradiating the liquid interface of the two-liquid system with sufficient electromagnetic radiation to prevent such vapor explosions.

2. The method of claim 1 wherein the electromagnetic radiation is gamma radiation.

3. A method of preventing vapor explosions in a chemical recovery furnace containing molten smelt caused by water contacting the molten smelt, comprising:
    irradiating the water-molten smelt interface with sufficient electromagnetic radiation to prevent such vapor explosions.

4. The method of claim 3 wherein the electromagnetic radiation is of sufficient energy and intensity to generate multiple bubble nuclei in the water phase sufficient to prevent such explosions.

5. The method of claim 4 wherein the electromagnetic radiation is gamma radiation which has an intensity ranging from 200 to 1,200,000 r/hr.

6. A method of preventing vapor explosions from a chemical recovery furnace containing molten smelt caused by water contacting the molten smelt, comprising:
    placing multiple sources of electromagnetic radiation around the periphery of the furnace, positioning the radiation sources to irradiate and penetrate into the water-molten smelt interface and irradiating the water-molten smelt interface with such electromagnetic radiation of sufficient intensity to prevent such vapor explosions.

7. The method of claim 6 wherein the electromagnetic radiation has sufficient intensity and energy to generate multiple bubble nuclei in the water phase sufficient to prevent such vapor explosions.

8. The method of claim 7 wherein the electromagnetic radiation is gamma radiation having an intensity ranging from 200 to 1,200,000 r/hr.

9. The method of claim 8 wherein the gamma radiation is generated from $Cs^{137}$.

* * * * *